Jan. 19, 1926. 1,570,426
L. A. M. BARASCUD
RAILWAY AIR BRAKE CONTROL VALVE
Filed Dec. 15, 1924

INVENTOR:
Louis Antoine Marie Barascud
BY
ATTORNEY

Patented Jan. 19, 1926.

1,570,426

UNITED STATES PATENT OFFICE.

LOUIS ANTOINE MARIE BARASCUD, OF PARIS, FRANCE.

RAILWAY AIR-BRAKE-CONTROL VALVE.

Application filed December 15, 1924. Serial No. 756,091.

*To all whom it may concern:*

Be it known that I, LOUIS ANTOINE MARIE BARASCUD, a citizen of the Republic of France, residing at Paris, France, have invented certain new and useful Improvements in Railway Air-Brake-Control Valves, of which the following is a specification.

In the specification appended to the French patent issued to me on the 7th day of September 1923 under Serial Number 571,269, I described a compressed air braking control device wherein the communications between the two tanks which the system includes are automatically established by means of valves whose operation is governed on the one hand by the air pressures prevailing in both tanks during the various braking and brake-releasing phases and on the other hand by the adjustment previously imparted to a spring located in the valves.

The object of my invention is to provide a valve adaptable to the aforesaid device and by means of which the pressure regimen in both tanks may be established by the sole action of compressed air without requiring the use of the spring which, in case of defective adjustment or of accidental disturbance, is liable to jeopardize the proper working of the system.

In order to make my invention more clearly understood I have illustrated as an example an embodiment thereof in and by a drawing appended hereto and wherein.

Figure 1:
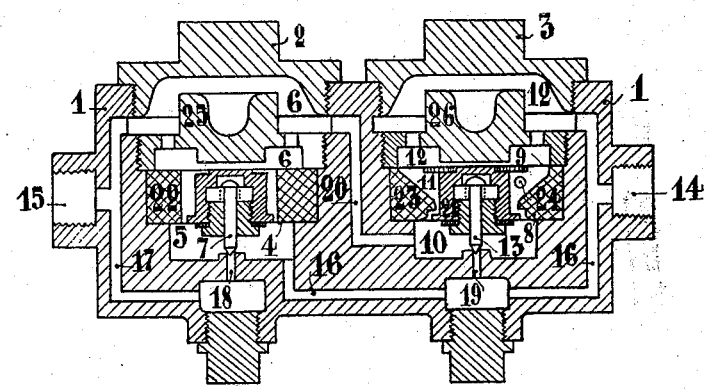
Figure 1 is a vertical sectional view of my valve.

A and B (Fig. 1) are the two tanks, I the valve forming the subject of my invention, C the three-way valve, D the train pipe, F the brake cylinder.

In the body 1 of the improved control valve I are provided two main compartments, cylindrical in shape one closed by plug 2 the other by plug 3.

The first of the said compartments (the one on the left hand side of Fig. 1) is divided into two chambers 5 and 6 partitioned from one another by a flexible diaphragm 4 on which is mounted a check valve 7; the second compartment (the one on the right hand side of the figure) is divided into three chambers 10, 11 and 12 by two flexible diaphragms 8 and 9, connected with one another by means of a cross-tie or brace 21.

Diaphragms 4, 8 and 9 are kept respectively fixed in their chambers and at the places shown by means of cross-ties or braces 22, 23 and of threaded plugs 25 and 26 apertured so as to allow compressed air to pass freely through these plugs.

Figure 2:
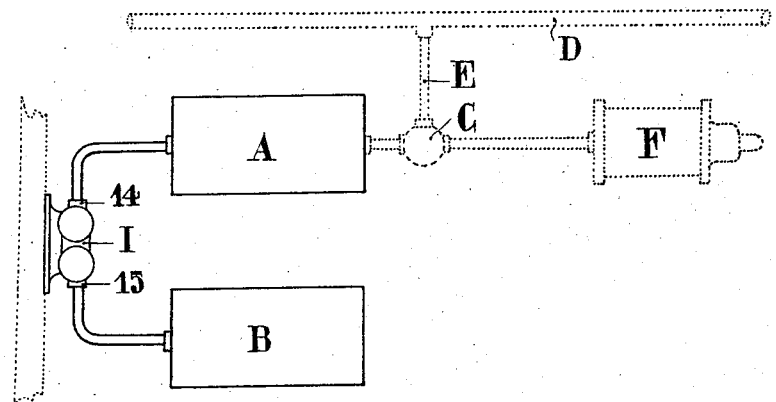
Figure 2 is a diagram showing the relative positions of the valve and of the other air devices of the brake of a vehicle provided with the twin-tank system according to the above mentioned patent.

Chambers 5 and 12 of the valve communicate with one another through a duct 16, itself communicating, through duct 14, with the first tank A of the device (see diagram Figure 2).

Chambers 6 and 10 communicate also with one another through duct 20. Said chambers 6 and 10 are, on the other hand, in constant communication with tank B (Figure 2) through ducts 15 and 17.

Chamber 11 is in constant communication with the atmosphere through aperture 24. In chamber 5, the check valve 7, which is rigidly connected with diaphragm 4 controls a duct 18 opening into duct 17.

In chamber 10, check valve 13, rigidly connected with diaphragm 8, controls a duct 19 opening into duct 16.

Reference to the diagram, Figure 2, will show that valve I is located between the first tank A and the second tank B. Said valve is connected with tank A through duct 14 and with tank B through duct 15. When the brake is being put on, compressed air coming from the train pipe D reaches, through duct E, the triple-valve C or the like and then goes first into tank A and next into tank B through valve I. Air gets into valve I through duct 14 (Figure 1), and goes through duct 16 into chamber 12 and then into chamber 5. The pressure which the compressed air in chamber 12 exerts on diaphragm 9 is transmitted by the cross-tie 21 to valve 13 and by means of this valve ensures the closing of duct 19.

In chamber 5, on the contrary, the pressure of the compressed air on diaphragm 4 immediately causes valve 7 to be lifted and duct 18 to be opened. Compressed air then passes from this duct 18 into duct 17 whence it goes, through duct 15, to tank B. Through the same conduct 17, compressed air reaches chamber 6 whence duct 20 leads it to chamber 10.

Ultimately all the chambers in the device become filled with compressed air at the pressure prevailing at the brake, except chamber 11 which constitutes, in fact, a neutral chamber constantly communicating with the atmosphere.

When, in order to put on the brake, a depression is caused in the train pipe D, part of the compressed air contained in tank A is fed, under usual conditions, through triple valve C into the braking cylinder F and pressure becomes reduced at once in tank A.

Said reduction of pressure is immediately transmitted through ducts 14 and 16 to chambers 5 and 12 of valve I.

Decreased air pressure in chamber 5 has the effect of rendering preponderating the action of the compressed air contained in chamber 6 on diaphragm 4. The downward pressure on diaphragm 4 keeps duct 18 closed by valve 7 thus cuts off communication between tank B and tank A.

In chamber 12 the reduction of pressure has the effect of decreasing the thrust which the diaphragm 9 of larger effective area exerts on valve 13 and which tends to keep duct 19 closed.

Said valve 13 will remain closed however, preventing air from tank B from passing into tank A through duct 19, so long as the thrust exerted on diaphragm 9 will remain greater than the thrust exerted in the opposite direction on the diaphragm 8 of smaller effective area in chamber 10.

Calling S the effective surface or area of diaphragm 9, $s$ the effective area of diaphragm 8, P the pressure in chamber 10 and consequently in tank B, it becomes apparent, as a matter of fact, that valve 13 will be enabled to open only if pressure $p$ in chamber 12 becomes less than $$\frac{P \times s}{S}.$$

By suitably proportioning the respective effective areas of diaphragms 8 and 9 I am, therefore, enabled to determine once for all the minimum depression value required to be produced in the train pipe in order to cause the reserve of compressed air contained in tank B to intervene in the braking operation. With all depressions less than to this minimum depression, braking will be obtained by the sole action of the compressed air contained in the first tank A and consequently the braking forces applied will be moderate.

Having now particularly ascertained and described the nature of my said invention as well as the manner in which the same is to be performed, I declare that what I claim is:

1. An air brake control valve, comprising a casing provided at each end with an aperture and having its interior divided into two main compartments; a flexible diaphragm in each compartment; a system of internal ducts in said casing extending from one aperture to the other and including ducts which open into the compartments at opposite sides of the diaphragms therein; and a valve in each compartment to control an associated duct of the system and itself operatively connected with the adjacent diaphragm.

2. An air brake control valve, comprising a casing provided at each end with an aperture and having its interior divided into two main compartments; a flexible diaphragm in one compartment to divide the same into upper and lower chambers; a pair of superposed flexible diaphragms in the other compartment to divide it into upper, lower and intermediate chambers; a connection between the two superposed diaphragms to cause them to move in unison; a system of internal ducts in said casing extending from one aperture to the other and including ducts which open into the upper and lower chambers of each compartment, and a duct leading from the intermediate chamber of the second-named compartment to atmosphere; and a diaphragm-operated valve in each compartment to control an associated duct of the system.

3. An air brake control valve, according to claim 2, in which one of the two superposed diaphragms has an appreciably greater effective area than the other.

4. An air brake control valve, according to claim 2, in which the diaphragms are operated exclusively by the preponderating pressures in the two compartments.

In testimony whereof I affix my signature.

LOUIS ANTOINE MARIE BARASCUD.